US011711226B2

(12) United States Patent
Hatfield et al.

(10) Patent No.: US 11,711,226 B2
(45) Date of Patent: Jul. 25, 2023

(54) VISUALIZING WEB CONFERENCE PARTICIPANTS IN SUBGROUPS

(71) Applicant: International Business Machines Corporation, Armonk, NY (US)

(72) Inventors: Jennifer M. Hatfield, San Francisco, CA (US); Sarbajit K. Rakshit, Kolkata (IN); Abhishek Malvankar, White Plains, NY (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 17/451,855

(22) Filed: Oct. 22, 2021

(65) Prior Publication Data

US 2023/0128334 A1    Apr. 27, 2023

(51) Int. Cl.
   *H04L 12/18*    (2006.01)
   *G06F 40/295*    (2020.01)
(52) U.S. Cl.
   CPC ........ *H04L 12/1818* (2013.01); *G06F 40/295* (2020.01); *H04L 12/1822* (2013.01)
(58) Field of Classification Search
   CPC ............. H04L 12/1818; H04L 12/1822; G06F 40/295
   See application file for complete search history.

(56) References Cited

U.S. PATENT DOCUMENTS

| 8,204,759 | B2 |   | 6/2012 | Ashour |  |
|---|---|---|---|---|---|
| 8,558,868 | B2 |   | 10/2013 | Prentice |  |
| 9,118,734 | B2 | * | 8/2015 | Kaminsky | H04L 65/403 |
| 9,401,937 | B1 | * | 7/2016 | Gottlieb | G06V 40/161 |
| 9,451,210 | B1 | * | 9/2016 | Smus | G06V 40/197 |
| 9,961,119 | B2 |   | 5/2018 | Bader-Natal |  |
| 9,985,916 | B2 | * | 5/2018 | Cecchi | G06Q 10/10 |
| 10,356,025 | B2 |   | 7/2019 | Allen |  |
| 10,360,894 | B1 |   | 7/2019 | Rakshit |  |
| 10,469,275 | B1 |   | 11/2019 | Broomall |  |
| 10,523,900 | B1 |   | 12/2019 | Jiang |  |
| 11,082,486 | B1 | * | 8/2021 | Brevoort | H04L 51/04 |
| 11,290,598 | B2 | * | 3/2022 | Murali | H04M 3/567 |
| 2012/0166534 | A1 |   | 6/2012 | Bentley |  |
| 2012/0212439 | A1 |   | 8/2012 | Haldar |  |
| 2013/0024531 | A1 |   | 1/2013 | Horstmann |  |

(Continued)

OTHER PUBLICATIONS

Abu-Jbara et al., "Subgroup Detection in Ideological Discussions", Proceedings of the 50th Annual Meeting of the Association for Computational Linguistics, Jul. 8-14, 2012, pp. 399-409.

(Continued)

*Primary Examiner* — Nazia Naoreen

(74) *Attorney, Agent, or Firm* — James L. Olsen

(57) ABSTRACT

Aspects of the present disclosure relate to generating and visualizing subgroups of participants within web-based conferences. Participant data for each of a plurality of participants attending a web-based conference can be obtained. The participant data can be analyzed for each of the plurality of participants. Each of the participants can be mapped to a subgroup of two or more subgroups based on the analysis. The two or more subgroups can then be visualized within the web-based conference to the participants.

14 Claims, 7 Drawing Sheets

(56) References Cited

U.S. PATENT DOCUMENTS

| | | |
|---|---|---|
| 2014/0111597 A1 | 4/2014 | Anderson |
| 2014/0229866 A1* | 8/2014 | Gottlieb ............... G06F 3/0486 709/204 |
| 2017/0093936 A1 | 3/2017 | Lau |
| 2018/0124132 A1 | 5/2018 | Assemaly Salama |
| 2019/0273627 A1 | 9/2019 | Whalin |
| 2020/0389506 A1 | 12/2020 | Rakshit |
| 2021/0125584 A1 | 4/2021 | Hitzler |

OTHER PUBLICATIONS

Chang et al., "mCAF: a multi-dimensional clustering algorithm for friends of social network services", SpringerPlus, 2016, 15 pages.

Eslami et al., "Friend Grouping Algorithms for Online Social Networks: preference, bias, and implications", 2014, 16 pages.

Kim et al., "Meeting Mediator: Enhancing Group Collaboration Using Sociometric Feedback", Nov. 8, 2008, 10 pages.

Mell et al., "The NIST Definition of Cloud Computing", National Institute of Standards and Technology, Special Publication 800-145, Sep. 2011, 7 pages.

Porter et al., "A Platform for AI-Enabled Real-Time Feedback to Promote Digital Collaboration", Sustainability 2020, Published: Dec. 8, 2020, 13 pages.

* cited by examiner

VISUALIZING WEB CONFERENCE PARTICIPANTS IN SUBGROUPS

BACKGROUND

The present disclosure relates generally to the field of computing, and in particular, to visualizing web conference participants in subgroups.

Web-based conferences have become increasingly common due to the recent increase in remote work. Web conferencing software facilitates communication between individuals online via transmission of audio/video (A/V) data of the individuals in real-time over a network.

SUMMARY

Aspects of the present disclosure relate to generating and visualizing subgroups of participants within web-based conferences. Participant data for each of a plurality of participants attending a web-based conference can be obtained. The participant data can be analyzed for each of the plurality of participants. Each of the participants can be mapped to a subgroup of two or more subgroups based on the analysis. The two or more subgroups can then be visualized within the web-based conference to the participants.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
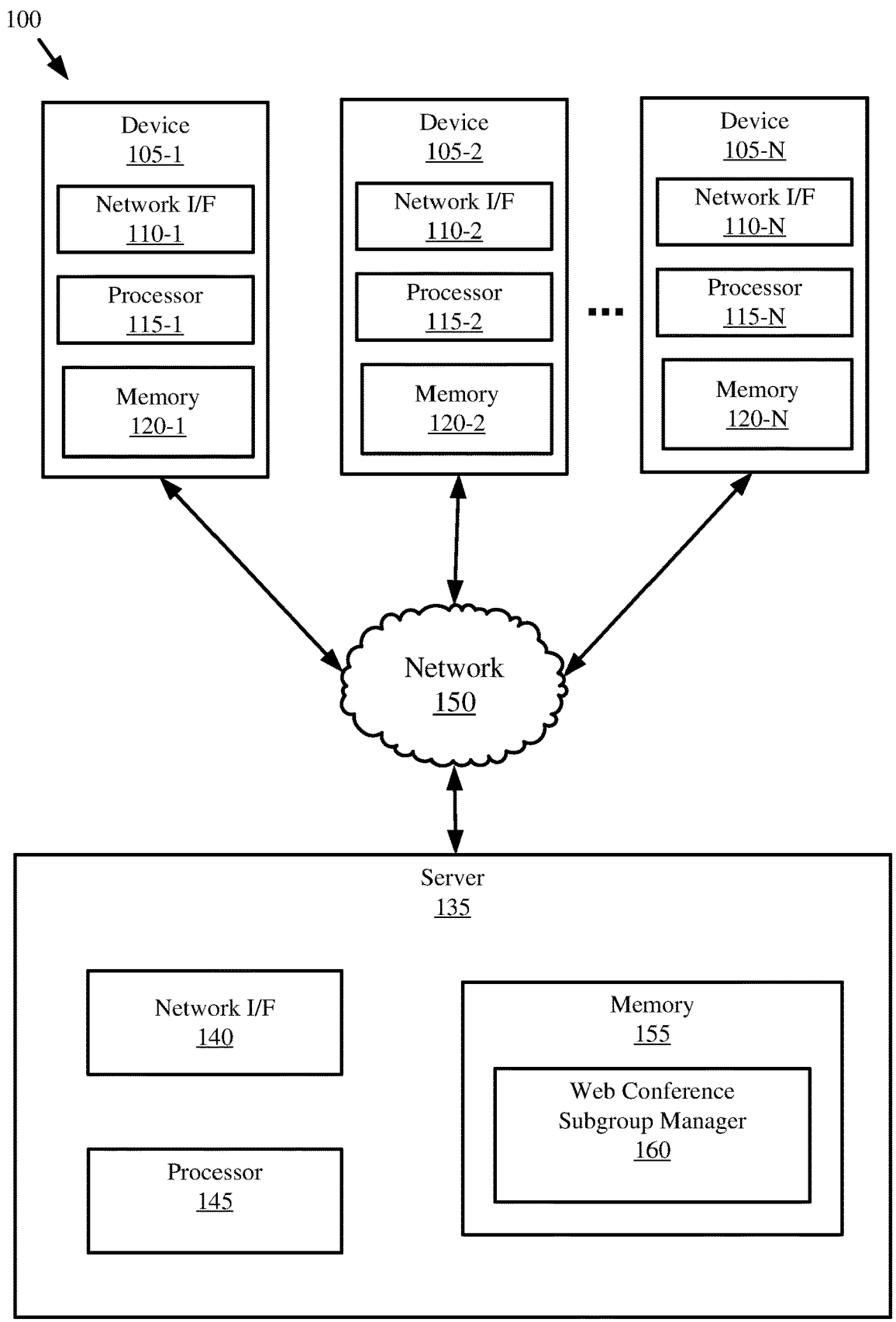
FIG. 1 is block diagram illustrating an example network environment, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to visualizing web conference participants in subgroups. While the present disclosure is not necessarily limited to such applications, various aspects of the disclosure may be appreciated through a discussion of various examples using this context.

Web-based conferences have become increasingly common due to the recent increase in remote work. Web conferencing software facilitates communication between individuals online via transmission of audio/video (A/V) data of the individuals in real-time over a network. Though web conferences have increased the ability for individuals to communicate in real-time, there are still improvements that need to be made. For example, in certain meetings, there can be a large number of individuals (e.g., 10-100) which can be displayed simultaneously within a web conferencing software. In these instances, it can be difficult for each user to understand each other user's role, organization, or purpose within the web-based conference. Further, participants within the web-based conference may not have adequate time while the meeting is occurring to research other users' information (e.g., role, team, company, etc.). Thus, there can be an information barrier between each participant during a web-based conference.

Aspects of the present disclosure relate to generating and visualizing subgroups of participants within web-based conferences. Participant data for each of a plurality of participants attending a web-based conference can be obtained. The participant data can be analyzed for each of the plurality of participants. Each of the participants can be mapped to a subgroup of two or more subgroups based on the analysis. The subgroups can then be visualized within the web-based conference to the participants.

There are various advantages to generating and visualizing subgroups of participants within web-based conferences. Visualizing defined/learned subgroupings can enhance the quality of web-based conferences, and may prompt participants within web-based conferences to more accurately direct their inquiries, locate contacts, build social networks, and the like. It may also enhance efficiency of teams and/or organization during the web-based conference, as collaboration between defined and/or learned subgroups can be encouraged based on the establishment and visualization of said subgroups.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110), and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, biometric scanner, video camera, or other input device) and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P)) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other, and communicate via any appropriate local communication medium. For example, the devices 105 and the server 135 can communicate using a local area network (LAN), one or more hardwired connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable), while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes a web conference subgroup manager 160. The web conference subgroup manager 160 can be configured to classify participants of web conferences into subgroups (e.g., groups, clusters, teams, etc.) and visualize the subgroups for the participants during a live web-based conference.

The web conference subgroup manager 160 can first be configured to receive an indication of a scheduled web-based conference with a set of participants. The web conference subgroup manager 160 can receive a scheduling notice from web-based conference software, from an email client, a user, or any other suitable source. The web conference subgroup manager 160 can then identify participants within the web-based conference. This can be completed by analyzing a participant list associated with the scheduled web-based conference. For example, the participant list can be a list of participants that have been invited to the web-based conference or that have accepted an invite to a web-based conference. In some embodiments, the participant list can be user-defined/provided.

The web conference subgroup manager 160 can then be configured to receive participant data of the set of participants that were identified. The participant data can include data obtained from various sources, such as social media data, group collaboration data (e.g., instant messaging data), employee directory data, past meeting data, past project data (e.g., GitHub data), location data, publication data, website data, etc.

The participant data can then be analyzed such that subgrouping of the participants can be completed. The participant data can be analyzed in any suitable manner. In embodiments, natural language processing (NLP) techniques (e.g., speech (POS) tagging, parsing, lemmatization, syntactic analysis, and semantic analysis) and/or machine learning (ML) techniques (e.g., clustering) can be performed on the participant data such that each participant can be assigned to a corresponding subgroup. That is, analysis can be performed to assign (e.g., classify) each participant in the web-based conference into a subgroup prior to, or during, the web-based conference. In embodiments, additional data, such as interaction data between participants during the meeting, can be considered to perform subgrouping and/or modify existing subgroupings.

In embodiments, subgroupings can be completed based on user definition. For example, a user (e.g., a meeting administrator or organizer) can be configured to define the desired subgroupings and define the specific participants of the web-based conference belonging to each respective subgrouping (e.g., subgroup mappings). This can be completed in instances where a user desires to have control over the defined subgroups and subgroup mappings. In embodiments, a hybrid approach can be implemented, where the user can define at least a portion of subgroups and/or a portion of mappings of participants to subgroups and where a machine learning (ML) and/or NLP based model can be configured to automatically define (e.g., learn) at least a portion of subgroups and/or a portion of subgroup mappings.

Upon determining subgroupings of participants, the web conference subgroup manager 160 can be configured to visualize the subgroupings of the participants during the web-based conference. Visualizing the subgroupings of the participants can be completed in any suitable manner. For example, the web conference subgroup manager 160 can be configured to generate lists of subgroups (e.g., within a total attendee list), arrange video feeds of each participant within a same subgroup together, generate avatars (e.g., fictional representations) of each participant and group each avatar together in a fictional view, etc. In embodiments, the web conference subgroup manager 160 can be configured to be integrated with, or interfaced with, a web-based meeting software application such that visualization of the defined/learned subgroups within a web-based conference can be completed.

Ultimately, the web conference subgroup manager 160 can aid participants in understanding the association of each other participant within the web-based conference. For example, the participants can be grouped and visualized based on role (e.g., manager teams, sales teams, financial teams, etc.), organization (e.g., company), project teams (e.g., a first team of employees working on a first aspect of software development versus a second team of employees working on a second aspect of software development), region (e.g., a first set of employees from a first region can be grouped in a first subgroup, while a second set of employees from a second region can be grouped in a second subgroup) or any other suitable feature. The manner in which subgrouping is performed can be based on user-defined criteria and/or the type of analysis completed by the web conference subgroup manager 160.

Visualizing defined/learned subgroupings can enhance the quality of web-based conferences, and may prompt participants within web-based conferences to more accurately direct their inquiries, locate contacts, build social networks, and the like. It may also enhance efficiency of teams and/or organization during the web-based conference, as collaboration between defined and/or learned subgroups can be encouraged based on the establishment and visualization of said subgroups.

Though this disclosure pertains to the collection of personal data (e.g., participant data), it is noted that in embodiments, users opt-in to the system (e.g., the web conference subgroup manager 160). In doing so, they are informed of what data is collected and how it will be used, that any collected personal data may be encrypted while being used, that users can opt-out at any time, and that if they opt-out, any personal data of the user is deleted.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. For example, though the web conference subgroup manager 160 is shown as located on the server 135, in some embodiments, the web conference subgroup manager 160 can be stored on devices 105. As an example, the functionalities of the web conference subgroup manager 160 can be associated with (e.g., integrated within) a software application (e.g., a web-conference software application) running on device 105-1.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
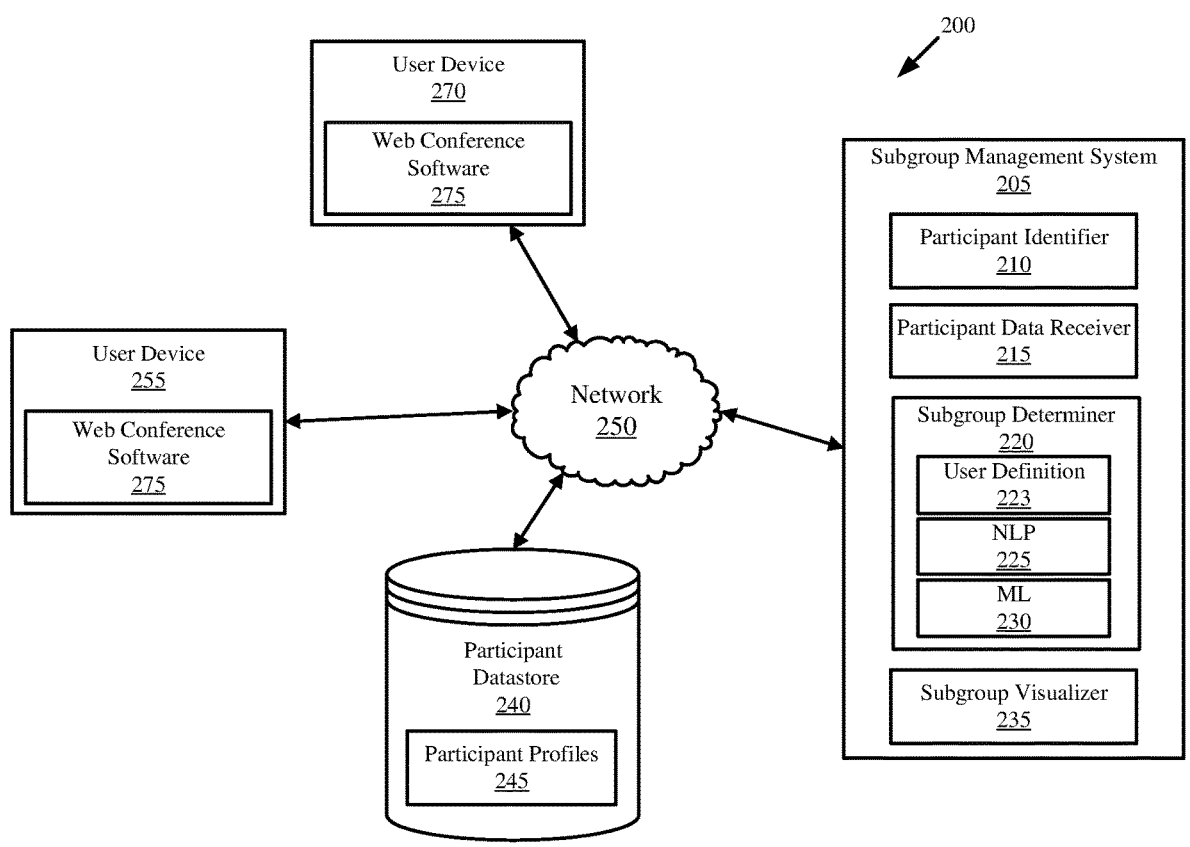
FIG. 2 is a block diagram illustrating an example network environment including a subgroup management system, in accordance with embodiments of the present disclosure.

Referring now to FIG. 2, shown is a block diagram illustrating an example network environment 200 in which illustrative embodiments of the present disclosure can be implemented. The network environment 200 includes a subgroup management system 205, a user device 255, a user device 270, and a participant datastore 240, each of which can be communicatively coupled for intercomponent interaction via a network 250.

The subgroup management system 205 can be configured to generate/identify subgroups, classify participants of web-based conferences into subgroups, and visualize the subgroups to the participants within web-based conferences. The subgroup management system 205 includes a participant identifier 210, a participant data receiver 215, a subgroup determiner 220, and a subgroup visualizer 235. The functionalities of the participant identifier 210, participant data receiver 215, subgroup determiner 220, and subgroup visualizer 235 can be processor-executable instructions that can be executed by a dedicated or shared processor using received inputs.

The subgroup management system 205 can first be established with required prerequisites and/or configuration settings. For example, the subgroup management system 205 can be configured such that it can access data sources (e.g., via user authorization) required for performing subgrouping. For example, opt-in integration can be established such that employee data (e.g., project data, role data, etc.) can be obtained from enterprises. Other data source access that can be authorized by users can include, but is not limited to, project data, social media data, past meeting data, location data, and group collaboration data.

Further, the subgroup management system 205 can be configured to access/interface web conference software 275 such that data can be obtained from web-based conferences and such that visualization of determined subgroupings can be completed within web conference software 275. Data that can be obtained from web conference software 275 can include, but is not limited to, audio/video (A/V) data, chat transcripts, meeting information (e.g., meeting name, meeting number, call-in information, etc.), and user information (e.g., usernames, host names, administrative users, etc.).

Further, settings for subgrouping can be defined such that subgrouping can be performed as desired. For example, a user (e.g., an administrator) can define whether they would like manual definition or automatic learning (e.g., via NLP and/or ML) of subgroupings. Additional subgrouping settings that users can modify include weighting of factors considered for grouping, how grouping should be performed (e.g., based on role versus project versus organization), the type of analysis performed (e.g., hierarchical clustering versus k-means clustering) on participant data, the amount and/or type of ingested data to be considered for each participant, thresholds for subgroup assignments, etc.

Further still, visualization settings can also be predefined by users. For example, the user can define the type of visualization they desire, such as visualizing subgroups via subgroup lists and/or by arranging video feeds of participants belonging to the same subgroup together.

The participant identifier 210 can be configured to identify participants within a web-based meeting such that subgrouping of identified participants can be completed. In embodiments, participants can be identified based on a participant list of invited individuals and/or based on individuals that have accepted a meeting invite to the web-based meeting. In some embodiments, participants can be identified as defined/provided by a user. In some embodiments, participants can be identified during a live web-conference via voice recognition, via image recognition, based on username, or any other suitable method.

In embodiments upon identifying a participant, an entry within participant profiles 245 corresponding to the participant can be referenced/stored within participant datastore 240. If the user has not previously existed, a new entry can be stored for the user. If the user already exists within participant datastore 240, the profile of the participant can be retrieved from participant profiles 245. This can allow fast and convenient location of participant data for each participant that may be referenced in the future.

The participant data receiver 215 can be configured to obtain, receive, and/or collect participant data for each identified participant involved in (or that will be involved in, in instances where subgroups are determined prior to the web-based conference occurring) a web-based conference. The participant data receiver 215 can receive authorization to access data sources from one or more users. Thereafter, the participant data receiver 215 can be configured to access various data sources. For example, data sources that can be accessed by the participant data receiver 215 include, but are not limited to, social media data, past meeting data, group collaboration data, employee directory data, location data (e.g., global positioning system (GPS) data, internet protocol (IP) addresses, etc.), publication data (e.g., research studies), and website data (e.g., a company website). In embodiments, participant profiles 245 may be accessed from participant datastore 240 which already include data corresponding to a particular participant. In embodiments, upon obtaining data associated with a given participant, a corresponding participant profile 245 can be generated/referenced such that the data associated with the participant can be stored in the profile, to be used for learned subgrouping in the future.

In embodiments, collection of participant data by the participant data receiver 215 may not be completed in instances where it is not necessary (e.g., where user definition of subgroups and mappings of participants to subgroups is completed).

The subgroup determiner 220 can be configured to determine subgroupings of participants. In embodiments, the subgroupings determined by the subgroup determiner 220 can be manually defined and/or automatically learned. For example, subgroup determiner 220 can receive user definition 223 from a user (e.g., user device 270) indicating at least one defined subgroup and/or at least one defined mapping of a participant to a subgroup. In contrast, the subgroup determiner 220 can be configured to automatically discover subgroups (e.g., based on an analysis of participant data) and thereafter assign participants to the learned subgroups.

In embodiments where the subgroup determiner 220 determines subgroups and subgroup mappings (e.g., mappings of participants to subgroups) based on user definition 223, the subgroup determiner 220 may be configured to receive (e.g., on a graphical user interface (GUI)) a selection from a user defining one or more subgroups. The user-defined subgroups can be based on any suitable criteria, such as role, team, region (e.g., location), or organization. Thereafter, the subgroup determiner 220 can be configured to receive one or more subgroup mapping selections from the user designating participants as members of the one or more previously defined subgroups.

In embodiments, natural language processing (NLP) 225 and machine learning 230 can be performed on the participant data to automatically learn subgroups and subgroup mappings. In embodiments, the participant data receiver 215 and/or subgroup determiner 220 can be configured to preprocess the participant data upon accessing participant data. Pre-processing can include, for example, converting data format (e.g., converting a document from a pdf format to plaintext), structuring data, and/or performing NLP 225 techniques on data such as part of speech (POS) tagging, parsing, lemmatization, syntactic analysis, and semantic analysis.

NLP 225 techniques performed on the participant data can include, but are not limited to, segmentation, relationship extraction, semantic parsing, terminology extraction, sentiment analysis, named entity recognition (NER), and entity linking. NER and entity linking can enable a participant to be identified within unstructured participant data and linked to one or more other entities recognized within the participant data. For example, a participant can be linked to another individual, a location, or an organization (e.g., a company). Based on a plurality of identified entities and entity linkages, subgroup determiner 220 can be configured to assign participants to subgroups. For example, a first participant of a web-based conference can be assigned to a first subgroup based on a first entity linkage identified via NLP 225. Thus, subgroups and participants can be discovered via NER and the participants can be assigned to subgroups via entity linking.

In embodiments, a relationship score (e.g., entity linkage score, confidence score, etc.) between two entities can be referenced to determine whether a given entity (e.g., participant) belongs to a given subgroup. For example, if a threshold relationship score for a given participant belonging to a subgroup "Student," is defined as 0.75, and the participant has a relationship score of 0.80 based on an NLP analysis of that participant's data, then the participant would be determined to belong to the subgroup "Student." In contrast, if a second participant was determined to have a relationship score of 0.50 to the subgroup "Student," a determination would be made that the second participant does not belong to the subgroup "Student."

In some embodiments, machine learning (ML) 230 techniques can be performed to discover subgroups and mappings of participants to subgroups. ML 230 algorithms that can be used to discover subgroups and mappings of participants to subgroups can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Any of the data discussed with respect to the subgroup management system 205 and/or participant datastore 240 can be analyzed or utilized as training data using any of the aforementioned machine learning algorithms.

More specifically, the ML 230 algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other ML 230 techniques.

In embodiments, clustering can be used to assign participants to one or more learned/defined subgroups. For example, each participant can be vectorized (e.g., numerically represented by one or more attributes, each having a direction and magnitude). Thereafter, based on the vector representation of each participant, each participant can be sorted into a corresponding subgroup. For example, each subgroup may correspond to a particular vector space, and any participants coinciding with that vector space may be included within that subgroup (e.g., cluster). However, any suitable clustering/classification technique can be used to assign participants to subgroups. Further, any suitable factors (e.g., vector features) can be used to influence subgroup placement.

In embodiments, if it is difficult to place a particular participant into a particular subgroup (e.g., a tiebreaker between two subgroups occurs), then an action can be completed by the subgroup determiner 220 to address the participant. For example, in some embodiments, the subgroup determiner 220 can allow the participant to belong to multiple subgroups simultaneously. Thus, upon visualization by the subgroup visualizer 235, the participant may be grouped with both subgroups. In some embodiments, the subgroup determiner 220 can monitor the participant's engagement within the web-based conference and determine which subgroup to place the participant in based on their engagement within the web-based meeting. For example, if the participant engages with a first subgroup more than a second subgroup (e.g., the user has more active speaking time associated with the first subgroup), then the subgroup determiner 220 can be configured to place the participant in the first subgroup based on the higher level of engagement. However, tie-breakers for participants which have a strong connection to multiple subgroups can be addressed in any suitable manner. For example, in some embodiments, user input can be requested to manually place the participant into a corresponding subgroup if it is difficult to ascertain which subgroup to place the participant in.

Figure 4:
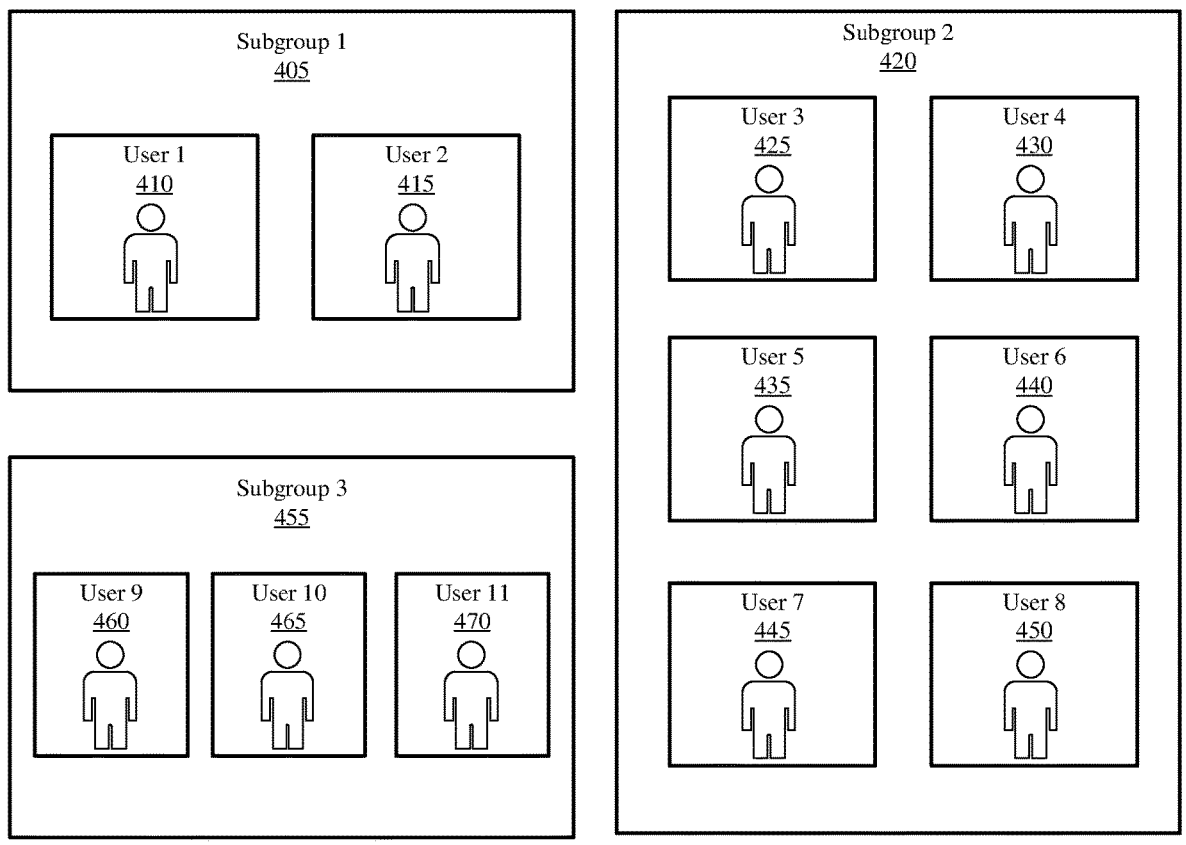
FIG. 4 is a block diagram illustrating an example view of visualized subgroups that can be displayed during a web-based conference, in accordance with embodiments of the present disclosure.

The subgroup visualizer 235 can be configured to visualize the determined subgroups and subgroup mappings of participants within web conference software 275 during a live web-based conference. The subgroup visualizer 235 can visualize the subgroups in any suitable manner. For example, the subgroup visualizer 235 can be configured to display a list of subgroups and corresponding participants belonging to each subgroup accessible by participants within web conference software 275. As another example, the subgroup visualizer 235 can be configured to group video feeds of each participant belonging to the same group together within a boundary designating the subgroup, as shown in the example of FIG. 4. As another example, the subgroup visualizer 235 can be configured to generate avatars (e.g., fictional representations) of each participant and group the avatars into a fictional view (e.g., of a meeting room) to convey the participants belonging to each subgroup. However, the subgroup visualizer 235 can visualize subgroups and subgroup mappings within web conference software 275 in any suitable manner, and is not limited to those described.

Figure 3:
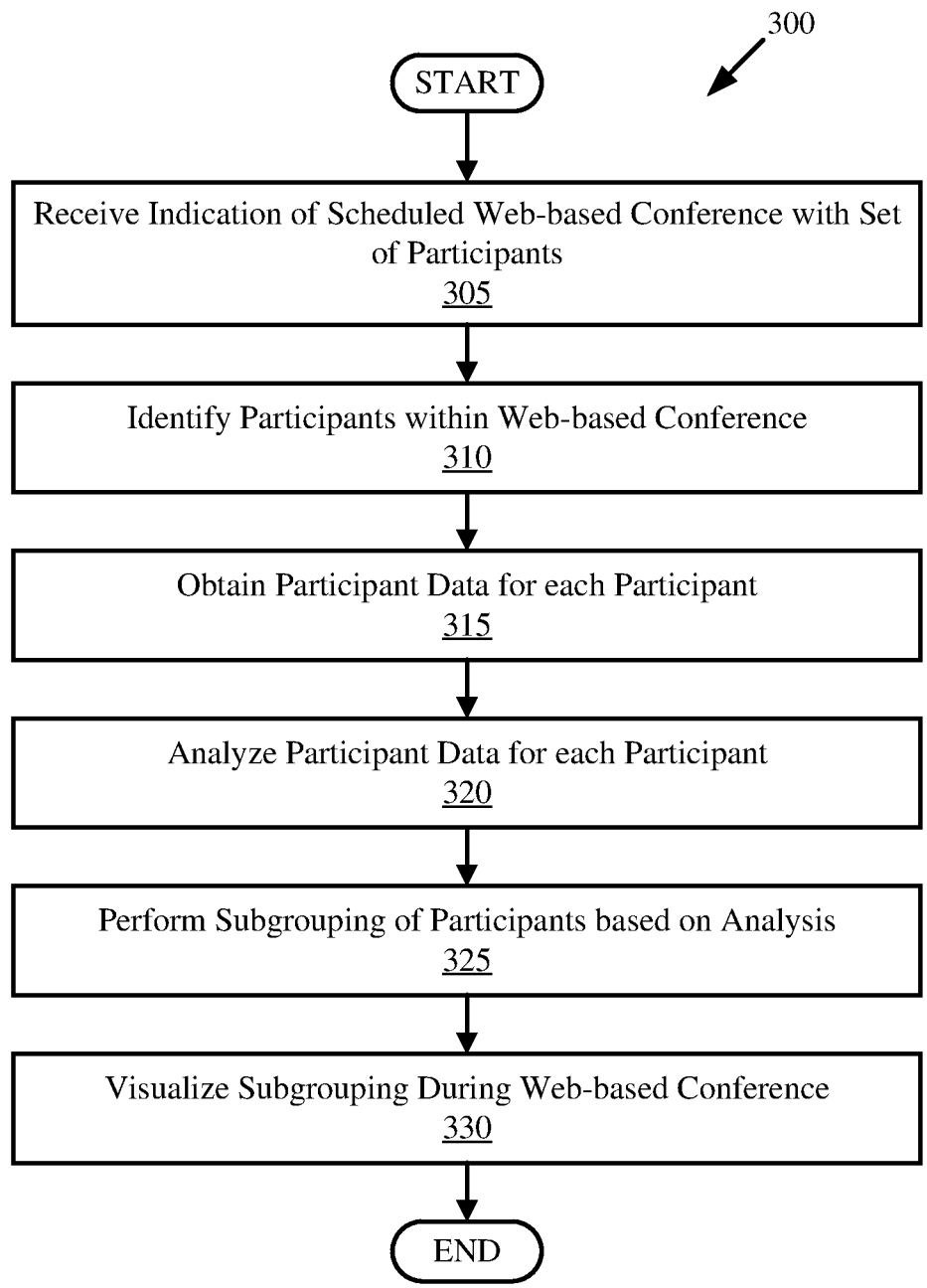
FIG. 3 is a flow-diagram illustrating an example method for generating and visualizing subgroups of participants in a web-based conference, in accordance with embodiments of the present disclosure.

Referring now to FIG. 3, shown is a flow-diagram of an example method 300 for generating and visualizing subgroups and subgroup mappings of participants of a web-based conference, in accordance with embodiments of the present disclosure. One or more operations of method 300 can be completed by one or more processing circuits (e.g., of devices 105, server 135, user devices 255/270, and/or subgroup management system 205).

Method 300 initiates at operation 305, where an indication of a scheduled web-based conference with a set of participants is received. The indication can be received in response to a meeting scheduled by a meeting host, meeting organizer, or other user. In embodiments, the indication can be received from web conference software (e.g., web conference software 275 of FIG. 2). In embodiments, the indication of the scheduled web-based conference can be received as manually indicated by a user (e.g., via a GUI).

Participants within the web-based conference are then identified. This is illustrated at operation 310. Identification of participants can be completed in the same, or a substantially similar manner, as described with respect to the participant identifier 210 of FIG. 2. For example, participants can be identified from a participant list of a scheduled web-based conference.

Participant data is then obtained for each participant. This is illustrated at operation 315. Obtaining participant data for each participant can be completed in the same, or a substantially similar manner, as described with respect to the participant data receiver 215 of FIG. 2. For example, access to participant data sources can be authorized by users and the data can be collected from various data sources (e.g., social media, past meetings, employee directory data, etc.).

The participant data is then analyzed for each participant. This is illustrated at operation 320. Analyzing participant data can include performing NLP and ML based algorithms on the received participant data. In embodiments, pre-processing of the participant data can be completed such that the data can be structured into a format suitable for analyzation by one or more natural language process and/or machine learning models. In embodiments, NLP techniques such as named entity recognition (NER) and entity linking can be performed on the participant data such that participants, subgroupings, and subgroup mappings can be identified. In embodiments, clustering can be performed based on the participant data such that similar participants (e.g., based on feature vectors) are clustered together into the same subgroups. However, any suitable analysis can be performed to identify subgroups, participants, and subgroup mappings.

Subgrouping of participants is then completed based on the analysis. This is illustrated at operation 325. For example, each participant that is determined to belong to a particular subgroup is stored within that subgroup (e.g., within a persistent memory). Subgroup determination can be completed in the same, or a substantially similar manner, as described with respect to the subgroup determiner 220 of FIG. 2.

The subgroupings are then visualized during a web-based conference. This is illustrated at operation 330. Visualization of subgroups during the web-based conference can be completed in the same, or a substantially similar manner, as described with respect to the subgroup visualizer 235 of FIG. 2. For example, subgroups can be displayed within a list, based on grouping video feeds of participants belonging to the same subgroup, based on a fictional representation depicting the subgroupings of each participant, etc.

The aforementioned operations can be completed in any order and are not limited to those described. Additionally, some, all, or none of the aforementioned operations can be completed, while still remaining within the spirit and scope of the present disclosure.

Referring now to FIG. 4, shown is an example subgrouping visualization that can be displayed within a web conference software (e.g., web conference software 275 of FIG. 2).

As depicted in FIG. 4, three subgroups are depicted. A first subgroup 405 includes a first user 410 and a second user 415. A second subgroup 420 includes a third user 425, a fourth user 430, a fifth user 435, a sixth user 440, a seventh user 445, and an eighth user 450. A third subgroup 455 includes a ninth user 460, tenth user 465, and an eleventh user 470.

The subgroup visualization depicted in FIG. 4 may each correspond to a video feed received from each respective user. For example, the first user 410 and second user 415 may have their video feed shown within the boundary of the first subgroup 405. In embodiments, the first subgroup 405, second subgroup 420, and third subgroup 455 can have a subgroup name associated with their boundaries. For example, the first subgroup 405 can be a first company name "Company A," the second subgroup 420 can be a second company name "Company B," and the third subgroup 455 can be a third company name "Company C." As another example, the first subgroup 405 name can correspond to "Sales Team," the second subgroup 420 name can correspond to "Finance Team," and the third subgroup 455 name can correspond to "Development Team." However, any suitable subgroup type and/or name can be depicted as associated with each subgroup boundary.

In embodiments, rather than video feeds being displayed with each participant, avatars or profile pictures of the user can be depicted. This can be implemented when users do not desire to have their video displayed and/or do not have access to video.

Though FIG. 4 depicts an example visualization of subgrouping of participants of a web-based conference, any suitable visualization of subgroups within a web-based conference can be implemented without departing from the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
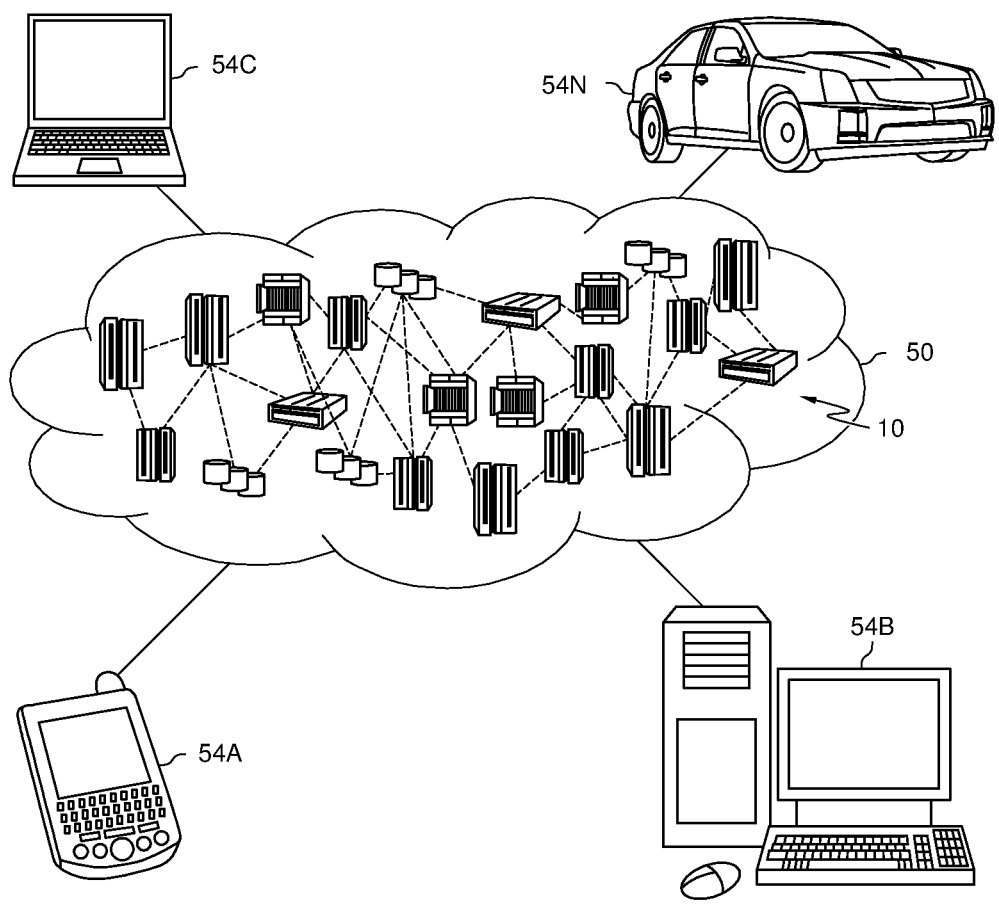
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
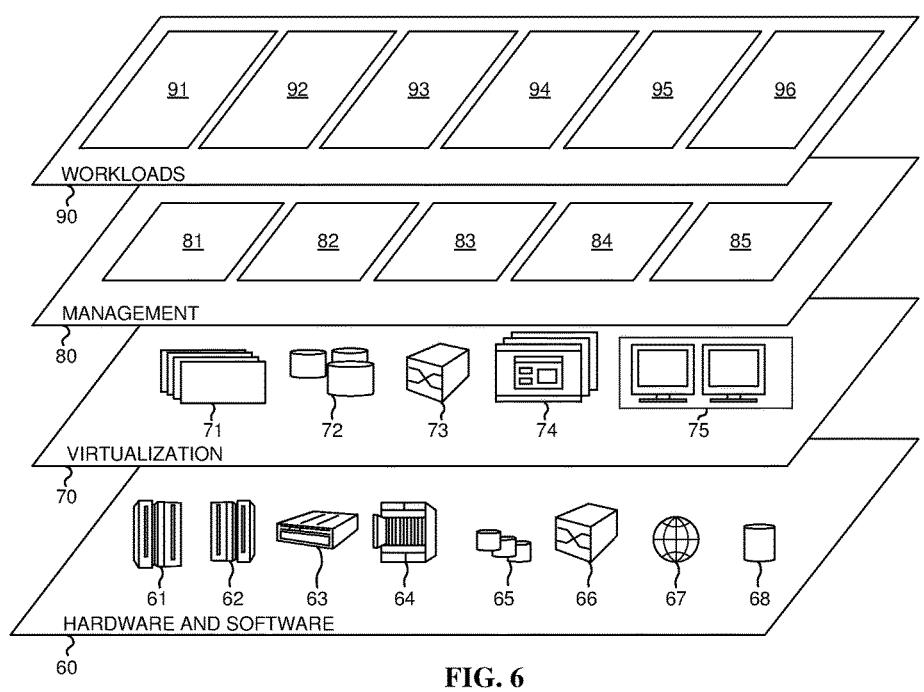
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and subgroup management 96.

Figure 7:
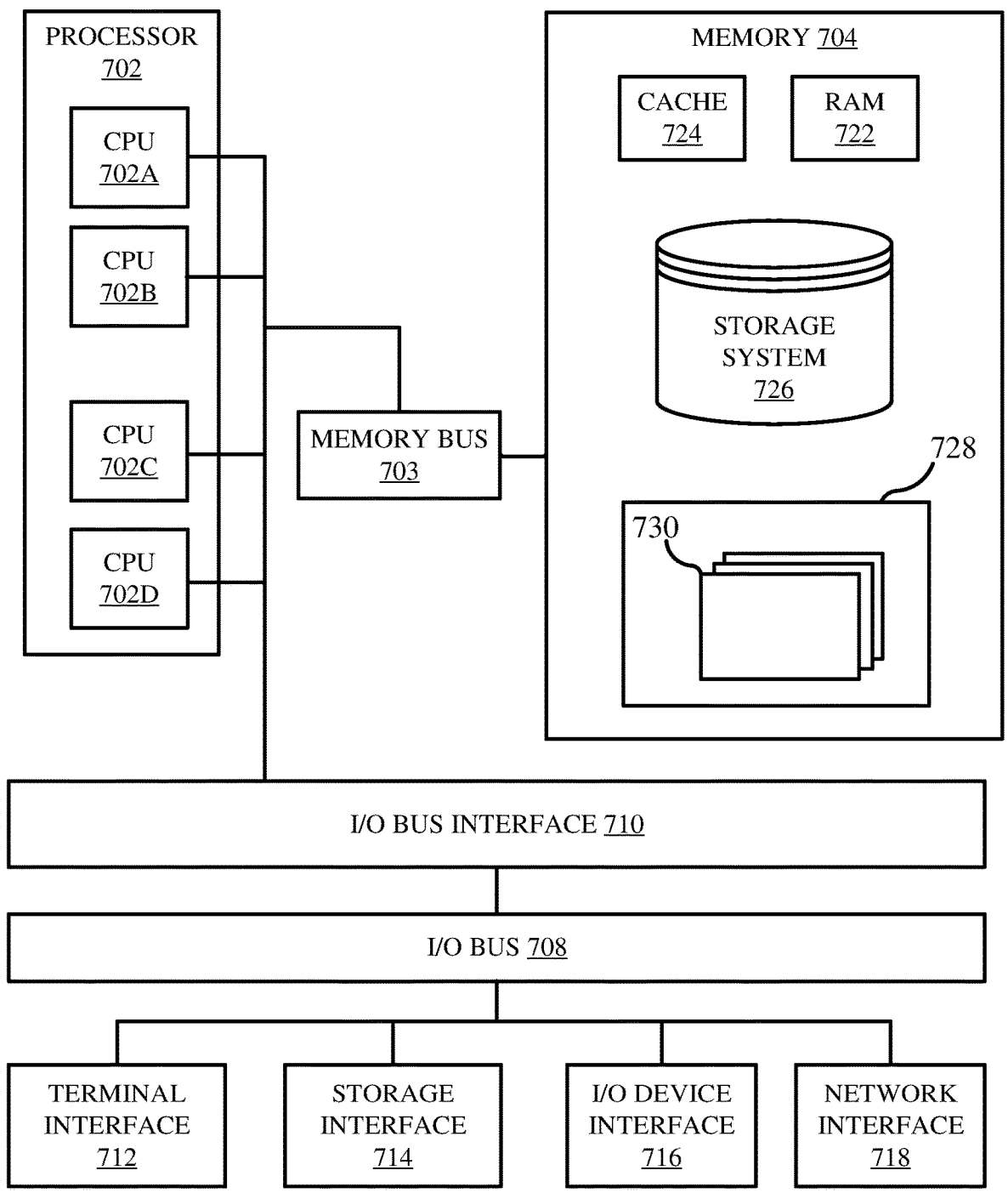
FIG. 7 is a high-level block diagram illustrating an example computer system that can be used in implementing one or more of the methods, tools, and modules, and any related functions described herein, in accordance with embodiments of the present disclosure.

Referring now to FIG. 7, shown is a high-level block diagram of an example computer system 701 (e.g., devices 105 and server 135) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The aforementioned operations can be completed in any order and are not limited to those described. Additionally, some, all, or none of the aforementioned operations can be completed, while still remaining within the spirit and scope of the present disclosure.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A method comprising:
   obtaining, upon initiation of a web-based conference, participant data for each of a plurality of participants attending the web-based conference;
   analyzing the participant data for each of the plurality of participants to automatically learn subgroups that each participant of the plurality of participants belong to upon initiation of the web-based conference;
   mapping each of the plurality of participants to a subgroup of two or more subgroups based on the analysis, wherein a first participant is mapped to a first subgroup based on a relationship score between the first participant and the first subgroup exceeding a threshold; and
   visualizing the two or more subgroups within the web-based conference to the plurality of participants, wherein visualizing the two or more subgroups within the web-based conference includes grouping video feeds of each of the plurality of participants belonging to a same subgroup together within a boundary during the web-based conference.

2. The method of claim 1, wherein analyzing the participant data includes performing named-entity recognition and entity linking on the participant data to determine the two or more subgroups and the mapping of each of the plurality of participants.

3. The method of claim 1, wherein the mapping further comprises clustering each of the plurality of participants to a subgroup of the two or more subgroups.

4. The method of claim 3, wherein the first participant is further mapped to the first subgroup based on a feature vector of the first participant coinciding with a vector space designating the first subgroup.

5. A system comprising:
   one or more processors; and
   one or more computer-readable storage media collectively storing program instructions which, when executed by the one or more processors, are configured to cause the one or more processors to perform a method comprising:

obtaining, upon initiation of a web-based conference, participant data for each of a plurality of participants attending the web-based conference;

analyzing the participant data for each of the plurality of participants to automatically learn subgroups that each participant of the plurality of participants belong to upon initiation of the web-based conference;

mapping each of the plurality of participants to a subgroup of two or more subgroups based on the analysis, wherein a first participant is mapped to a first subgroup based on a relationship score between the first participant and the first subgroup exceeding a threshold; and visualizing the two or more subgroups within the web-based conference to the plurality of participants, wherein visualizing the two or more subgroups within the web-based conference includes grouping video feeds of each of the plurality of participants belonging to a same subgroup together within a boundary during the web-based conference.

6. The system of claim 5, wherein analyzing the participant data includes performing named-entity recognition and entity linking on the participant data to determine the two or more subgroups and the mapping of each of the plurality of participants.

7. The system of claim 5, wherein the mapping further comprises clustering each of the plurality of participants to a subgroup of the two or more subgroups.

8. The system of claim 7, wherein the first participant is further mapped to the first subgroup based on a feature vector of the first participant coinciding with a vector space designating the first subgroup.

9. The system of claim 5, wherein visualizing the two or more subgroups within the web-based conference includes displaying a participant list having each of the two or more subgroups with participants mapped to each subgroup displayed below their respective mapped subgroup.

10. A computer program product comprising one or more computer readable storage media, and program instructions collectively stored on the one or more computer readable storage media, the program instructions comprising instructions configured to cause one or more processors to perform a method comprising:

obtaining, upon initiation of a web-based conference, participant data for each of a plurality of participants attending the web-based conference;

analyzing the participant data for each of the plurality of participants to automatically learn subgroups that each participant of the plurality of participants belong to upon initiation of the web-based conference;

mapping each of the plurality of participants to a subgroup of two or more subgroups based on the analysis, wherein a first participant is mapped to a first subgroup based on a relationship score between the first participant and the first subgroup exceeding a threshold; and visualizing the two or more subgroups within the web-based conference to the plurality of participants, wherein visualizing the two or more subgroups within the web-based conference includes grouping video feeds of each of the plurality of participants belonging to a same subgroup together within a boundary during the web-based conference.

11. The computer program product of claim 10, wherein analyzing the participant data includes performing named-entity recognition and entity linking on the participant data to determine the two or more subgroups and the mapping of each of the plurality of participants.

12. The computer program product of claim 10, wherein the mapping further comprises each of the plurality of participants to a subgroup of the two or more subgroups.

13. The computer program product of claim 12, wherein the first participant is further mapped to the first subgroup based on a feature vector of the first participant coinciding with a vector space designating the first subgroup.

14. The computer program product of claim 10, wherein visualizing the two or more subgroups within the web-based conference includes displaying a participant list having each of the two or more subgroups with participants mapped to each subgroup displayed below their respective mapped subgroup.

* * * * *